United States Patent [19]

Hay et al.

[11] Patent Number: 5,869,599
[45] Date of Patent: Feb. 9, 1999

[54] FREE RADICAL RING OPENING FOR POLYMERIZATION OF CYCLIC OLIGOMERS CONTAINING AN AROMATIC SULFIDE LINKAGE

[76] Inventors: Allan S. Hay, 5051 Glencairn Avenue, Montreal, Quebec H3W 2B3, Canada; Yifeng Wang, 4660 Dupuis Avenue, Apt #4, Montreal, Quebec H3W 1N3, Canada

[21] Appl. No.: 925,124

[22] Filed: Sep. 8, 1997

Related U.S. Application Data

[63] Continuation of Ser. No. 419,112, Apr. 10, 1995, abandoned.
[51] Int. Cl.$^6$ ........................................ C08G 75/14
[52] U.S. Cl. .......................... 528/389; 528/377; 528/378; 528/387

[58] Field of Search ........................................ 528/377, 378, 528/387, 389

[56] References Cited

U.S. PATENT DOCUMENTS 5,354,841  10/1994  Geibel et al. ............................ 528/388
5,384,391   1/1995  Miyata et al. ........................... 528/377

*Primary Examiner*—Helen L. Pezzuto
*Attorney, Agent, or Firm*—Swabey Ogilvy Renault

[57] ABSTRACT

A polyarylene sulfide free of inorganic contaminants, especially residues of inorganic polymerization catalysts, is produced by the free radical, ring-opening polymerization of a cyclic thioether.

26 Claims, No Drawings

FREE RADICAL RING OPENING FOR POLYMERIZATION OF CYCLIC OLIGOMERS CONTAINING AN AROMATIC SULFIDE LINKAGE

This is a Continuation of application Ser. No. 08/419,122, filed Apr. 10, 1995, now abandoned.

BACKGROUND OF THE INVENTION i) Field of the Invention

This invention relates to a process for producing a polyarylene sulfide, more especially an non-ionic process for producing a polyarylene sulfide from a cyclic thioether; and to a novel polyarylene sulfide and composites containing the polyarylene sulfide, the invention also relates to novel cyclic oligomers which are intermediates for manufacture of polyarylene sulfides.

ii) Description of Prior Art

Aryl thioether polymers such as polyphenylene sulfide (PPS) are known for their thermal stability and chemical resistance and as such are of value in the manufacture of molded products employed in applications where thermal stability and chemical resistance are important.

U.S. Pat. No. 5,384,391 describes prior processes for producing polyarylene sulfides involving a condensation polymerization involving a nucleophilic reaction between a dihalo-aromatic compound and an alkali metal compound in an organic amide solvent. This process is an ionic process.

U.S. Pat. No. 5,384,391 describes the problems associated with this prior process and proposes a process in which a cyclic arylene sulfide oligomer is heated in the presence of a ring-opening polymerization catalyst which is cationic or anionic in nature.

Prior processes for producing polyarylene sulfides result in polymers containing inorganic contaminants derived from the inorganic polymerization catalysts. These contaminants deleteriously affect the properties of the polyarylene sulfide, for example, the electrical characteristics. Furthermore, the polyarylene sulfides are frequently molded to form articles and the molded polymer is reinforced with inorganic fibers, for example, glass fibers. The high melt viscosities of the linear high molecular weight polymers make it difficult to fabricate fiber filled composites with high loadings of the fiber.

The use of cyclic oligomer precursors which can be polymerized in situ by the addition of a ring opening initiator would allow formation of composite structures with high fiber loadings because of their low melt viscosity.

It would also be advantageous to produce polyarylene sulfides free of inorganic contaminants resulting from anionic or cationic initiators or catalysts.

SUMMARY OF THE INVENTION

It is an object of this invention to provide a non-ionic process for producing polyarylene sulfides by the ring opening polymerization of a cyclic arylthioether.

It is a further object of this invention to provide a novel polyarylene sulfide free from inorganic contaminants.

It is another object of this invention to provide a composite comprising molded polyarylene sulfide free from inorganic contaminants and reinforced with inorganic reinforcing elements.

It is yet another object of this invention to provide novel cyclic (arylether sulfoxide) oligomers novel cyclic arylthioethers and linear polymers therefrom.

In accordance with the invention there is provided a process for producing a polyarylene sulfide comprising free-radical, ring-opening polymerization of a cyclic thioether.

In accordance with another aspect of the invention there is provided a polyarylene sulfide free of residues of inorganic polymerization catalysts.

In accordance with yet another aspect of the invention there is provided a composite comprising a molded polyarylene sulfide free of residues of inorganic polymerization catalysts with inorganic reinforcing elements throughout said molded polyarylene sulfide.

DESCRIPTION OF PREFERRED EMBODIMENTS a) Polymerization

The ring-opening polymerization of the invention is, in particular, carried out at an elevated temperature in the presence of a polymerization initiator effective at such elevated temperature to generate sulfur-containing free radicals.

Suitably the elevated temperature is from 250° to 400° C., preferably 300° to 360° C.

Suitably the initiator is elemental sulfur or an organic disulfide, for example, 2,2'-dithiobis(benzothiazole), diphenyl disulfide, dinaphthyl disulfide or mixtures of sulfur with these disulfides and is employed in an amount of 0.5–5.0 (mole) % based on structural units in the cyclic arylthioether.

The cyclic arylthioethers employed in the process of the invention are in particular cyclic oligmers containing at least one and preferably 2 to 8 units of formula (I):

(I)

in which Ar is an arylene radical of 6 to 24 carbon atoms, unsubstituted or substituted by $C_1$–$C_{12}$ alkyl or $C_1$–$C_{12}$ alkoxy.

Such oligomers produce, in accordance with the invention, high molecular weight non-cyclic polyarylene sulfides containing said units by a ring opening polymerization reaction.

It will be understood that the cyclic oligomers may contain other units in addition to those of formula (I) and such other units will then occur in the polyarylene sulfide. Other units which may be linked to the units of formula (I) in the cyclic oligmers and the resulting polyarylene sulfides include:

—(II)

in which $Y_1$ and $Y_2$ are the same or different and are —S— or —O—, and $Ar_1$ is a divalent arylene radical, for example:

phenylene

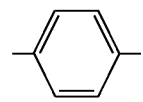

biphenylene

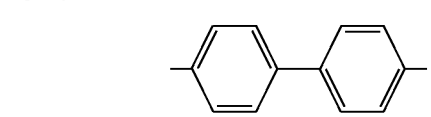

4, 4'-thiodiphenyl 4, 4'-oxydiphenyl 2, 2'-bis(4-phenyl)hexafluoropropane diphenyl fluorene radicals carbonyl-diphenyl diphenyl-dibenzoylbenzene radicals ii) —Ar$_2$—CO—    (III)

in which Ar$_2$ is as defined for Ar$_1$.

The cyclic oligomers may contain units of type i) or type ii) or both units of type i) and type ii).

b) Cyclic Oligomers

The cyclic oligomers may, in particular embodiments, be represented by the general formula (IV):

$$[\text{Ar}-\text{S}-\text{Ar}-\text{Y}_1-\text{Ar}_1-\text{Y}_2]_n \quad (IV)$$

in which Ar, Ar$_1$, Y$_1$ and Y$_2$ are as defined hereinbefore and n is an integer of 2 to 8; or by the general formula (V):

$$[[\text{Ar}_2\text{CO}[\text{Ar}-\text{S}]_m\text{Ar}_2\text{CO}-\text{Ar}_2-\text{Y}_1-\text{Ar}_1-\text{Y}_2]]_p \quad (V)$$

in which Ar, Ar$_1$, Ar$_2$, Y$_1$ and Y$_2$ are as defined hereinbefore, m is an integer of 2, to 6 and p is an integer of 1 to 8; or by the general formula (VI):

$$[\text{Ar}_2-\text{CO}-\text{Ar}-\text{S}]_n \quad (VI)$$

in which Ar, Ar$_2$ and n are as defined hereinbefore.

The cyclic oligomers of formula (IV), (V) and (VI) are novel, provided that the arylene radical Ar is different from the arylene radical Ar$_1$ or Ar$_2$.

Those oligomers of formula (IV), (V) and (VI) are of particular interest in which at least one of Y$_1$ and Y$_2$ is —O—.

The cyclic oligomers can be produced by several processes as follows:

i) The procedure for producing cyclic oligomers described in U.S. patent application Ser. No. 204,065, filed Mar. 1, 1994, A. S. Hay et al, the teaching of which is incorporated by reference, may be used to produce the cyclic oligomers of this invention, employing, for example, thiobisphenol.

ii) Cyclic (aryl ether sulfoxide)s oligomers can be prepared as described in Scheme I below:

Scheme I $$X-\phi-\overset{O}{\underset{S}{\|}}-\phi-X + HY-Ar-YH$$

X = F or Cl     Y = O, S

↓ base $$\{-\phi-\overset{O}{\underset{S}{\|}}-\phi-Y-Ar-Y-\}_n$$

Scheme I shows the synthesis of cyclic poly(aryl ether sulfoxide) oligomers. Convenient and efficient pseudo-high dilution conditions are employed, without the need of employing bisphenols with special geometry that promote cyclic formation. Such cyclic (aryl ether sulfoxide)s are synthesized in high yield from the corresponding bisphenol and difluoro- or dichloro-monomers. The buildup of cyclic products can be as high as 0.050 M concentration.

Furthermore, a series of co-cyclic oligomers is produced when a mixture of two different bisphenols (Table II) or two different difluoro- or dichloromonomers (Table III) are employed. Their cyclic nature can be unambiguously confirmed by a combination of matrix assisted laser desorption mass spectrometry (MALDI-TOF-MS), $^1$H and $^{13}$C NMR, reverse phase high pressure liquid chromatography (HPLC), and gel permeation chromatography (GPC) techniques.

The distribution of cyclics in the mixtures as revealed by GPC are similar and the yield of cyclic dimers is not very high. A typical cyclic mixture contains 27.5% dimer, 16.1% trimer, 9.8% tetramer, 6.6% pentamer, 5.0% hexamer and 35.0% higher homologues.

The sulfoxide cyclics can then be reduced to the corresponding sulfide oligomers by reaction with, e.g., tetrabutylammonium iodide and oxalyl chloride, elemental sulfur, etc. iii) Cyclic poly(arylene)sulfides can be prepared by a modification of the process first described by Franke and Vogtle (J. Franke and F. Vogtle, Tetrahedron Letters 32, 3445-9 (1984), as illustrated in Scheme II below:

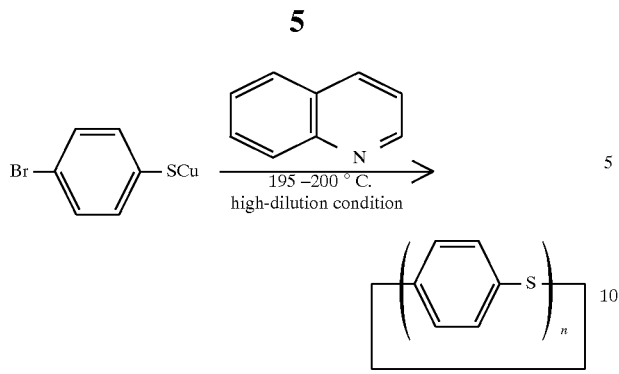

Small amounts of poly(arylene)sulfide cyclic oligomers have also been identified in commercial grades of poly(arylene)sulfides and it has been observed that low molecular weight poly(arylene)-sulfides can be obtained by heating the cyclic hexamer near the melting point. (D. A. Zimmerman and H. Ishida, "Characterization and Polymerization of the Cyclic Hexamer of p-Phenylene Sulfide". Abstract of presentation at the International Union of Pure and Applied Chemistry, International Symposium on Macromolecules, The University of Akron, Akron, Ohio, Jul. 11–15, 1994, p. 160).

The cyclic (arylether sulfoxide) oligomers produced as intermediates in the preparation of cyclic oligomers for use in the process of the invention, also form an aspect of the invention.

Thus in accordance with another aspect of the invention there is provided a cyclic (arylether sulfoxide) oligomer of formula (IVA)

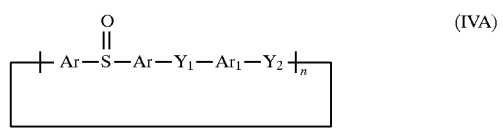

in which $Y_1$ and $Y_2$ are the same or different and are —S— or —O—, Ar is as defined previously and $Ar_1$ is a divalent arylene radical, for example:

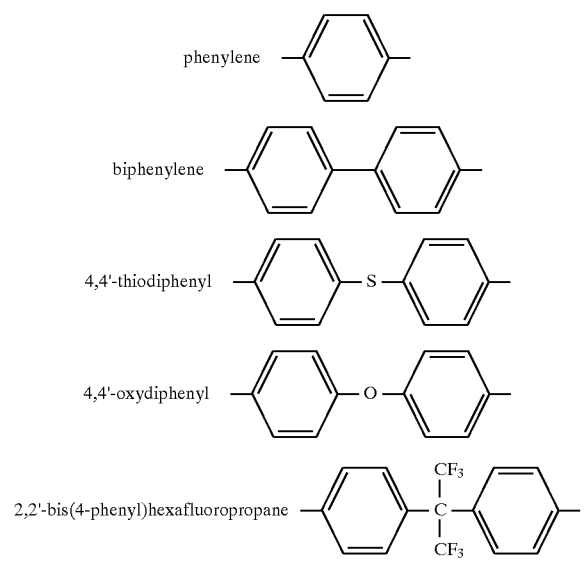

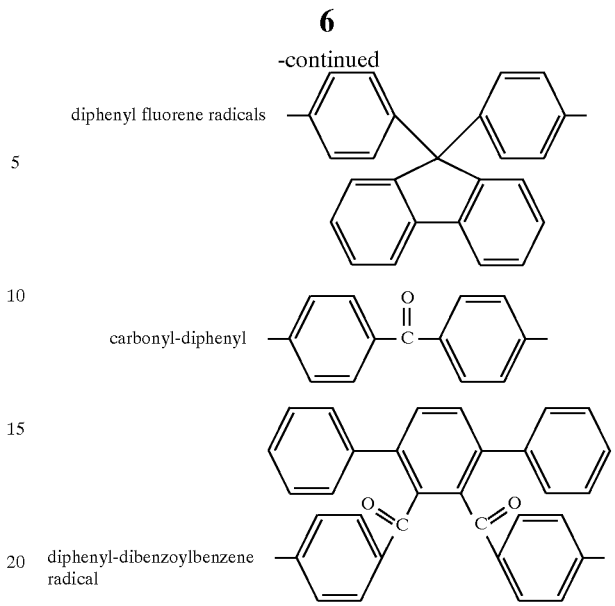

and, n is an integer of 2 to 8.

In another aspect of the invention there is provided a process for producing cyclic aromatic thioether oligomers which comprises reducing the sulfoxide groups in an oligomer of formula (IVA), as defined hereinbefore, with a reducing agent.

c) Polymers

The poly(arylene)sulfides of the invention are suitably produced as molded articles by carrying out the ring-opening polymerization of the invention in a mold.

Suitably the cyclic oligmer may be mixed with inorganic reinforcing elements, for example, glass fibers or carbon fibers thereby resulting in a composite in which the molded article is reinforced.

It is a particular advantage of the ring-opening polymerization of the invention that the resulting polymer is free of inorganic contaminants such as are normally present in poly(arylene) sulfides, being derived from the inorganic materials such as inorganic catalysts, employed in the polymerization.

In addition anionic catalysts, in particular phenoxides, tend to react with glass fibers at elevated temperatures so that the initiator is deactivated. The free-radical, ring-opening polymerization of the invention avoids such problems.

The polymerization process of this invention employs a polymerization initiator which develops free radicals for the polymerization, and the initiator itself is incorporated in the polymer. Thus, in the case where the initiator is 2,2'-dithiobis(benzothiazole), the thiobenzothiazole units from the initiator will occupy terminal positions in the final polymer.

These polymerization initiators may, in some contexts, be thought of as catalysts and are sometimes referred to herein as being catalysts or being present in catalytic amounts, however, they are more properly considered as polymerization initiators.

The linear polymers produced from the cyclic oligomers may in particular contain units of formulae (VII), (VIII) or (IX):

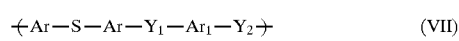 (VII)

-continued

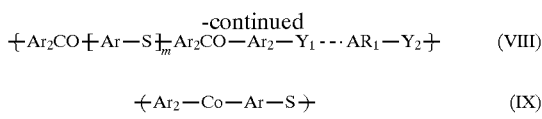

wherein Ar, $Ar_1$, $Ar_2$, $Y_1$, $Y_2$ and m are as defined hereinbefore.

Those linear polymers in which Ar is different from $Ar_1$ or $Ar_2$ are novel; and polymers in which at least one of $Y_1$ and $Y_2$ is —O— are of particular interest.

The linear polymers are, in particular, highly crystalline and of high molecular weight, typically about 20,000.

EXAMPLES

Preparation of cyclic (aryl ether sulfoxide)s oligomers

Scheme 1

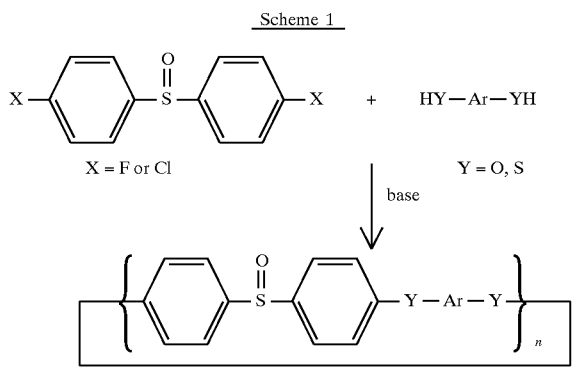

Scheme I schematically shows the general starting materials and the cyclic poly(aryl ether sulfoxide) oligomer products. Convenient and efficient pseudo-high dilution conditions have been employed, without the need of employing bisphenols with special geometry that promote cyclic formation. A number of cyclic (aryl ether sulfoxide)s have been synthesized in high yield (Table I) from the corresponding bisphenol and difluoro-monomers. The buildup of cyclic products can be as high as 0.050 M concentration. Furthermore, a series of co-cyclic oligomers were prepared when a mixture of two different bisphenols (Table II) or two different difluoro-monomers (Table III) were employed. Their cyclic nature has been unambiguously confirmed by a combination of matrix assisted laser desorption mass spectrometry (MALDI-TOF-MS), $^1H$ and $^{13}C$ NMR, reverse phase high pressure liquid chromatography (HPLC), and gel permeation chromatography (GPC) techniques.

The distribution of cyclics in the mixtures as revealed by GPC are similar and the yield of cyclic dimers is not very high. A typical cyclic mixture contain 27.5% dimer, 16.1% trimer, 9.8% tetramer, 6.6% pentamer, 5.0% hexamer and 35.0% higher homologues. The following examples are illustrative and not intended to limit its scope.

Example 1

The cyclization reaction was conducted in a 1 L three-necked round bottom flask which was equipped with a Dean-Stark trap and condenser, a thermometer, a nitrogen inlet, and magnetic stirring. The reaction vessel was charged with dimethylformamide (DMF) (470mL), toluene (70 mL) and anhydrous potassium carbonate (5.528 g, 40.0 mmol). The mixture was magnetically stirred and heated to reflux under $N_2$. The refluxing temperature was in the range of 145°–8° C. Then, a solution of 4,4'-difluoroplhenyl sulfoxide (4.7650 g, 20.0 mmol) and hydroquinine (2.2202 g, 20.0 mmol) in DMF (30 mL) was added over a period of 8 via a syringe pump. After the addition, the resulting mixture was kept refluxing for another 8 h. The reaction mixture was then cooled and filtered to remove salts. The solution was concentrated to 100 nriL under reduced pressure and added dropwise to vigorously stirred distilled water (700 mL) containing 10 mL of concentrated hydrochloric acid. The desired oligomers precipitated as white solid. The solid was collected by filtration and washed several times with distilled water. Then the cyclic oligomers were transferred to a beaker containing 200 mL methanol. After stirring for 10 min, the cyclic oligomers were filtered and dried in a vacuum oven (140° C.) for 24 h to give 5.7 g (92% yield) ot cyclic oligomers 1.

Examples 2–5

The above procedure was repeated replacing hydroquinone with 4,4'-biphenol, 4,4'-thiodiphenol, 2,2'-bis(4-hydroxyphenyl) hexafluoropropane and 9,9'-bis(4-hydroxyphenyl) fluorene, respectively.

TABLE I

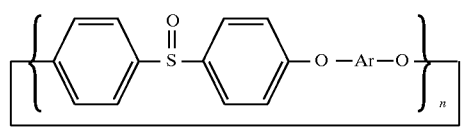

| Example | Ar | | | | | |
|---|---|---|---|---|---|---|
| 1 | (phenyl) | 92 | 996 | 1373 | 165 | 363 |
| 2 | (biphenyl) | 96 | 1226 | 2276 | 199 | 363 |

TABLE I-continued $$\left\{ \left\langle \bigcirc \right\rangle - \underset{\underset{O}{\overset{O}{\overset{\|}{S}}}}{-} \left\langle \bigcirc \right\rangle - O - Ar - O \right\}_n$$

| Example | Ar | | | | |
|---------|-----|----|------|------|-----|-----|
| 3 | –⟨C₆H₄⟩–S–⟨C₆H₄⟩– | 98 | 1711 | 4943 | 141 | 370 |
| 4 | –⟨C₆H₄⟩–C(CF₃)₂–⟨C₆H₄⟩– | 97 | 2194 | 7906 | 177 | 402 |
| 5 | –⟨C₆H₄⟩–(fluorenyl)–⟨C₆H₄⟩– | 95 | 1939 | 8156 | 260 | 412 | a): Isolated yield.
b): measured by GPC and calibrated against polystyrene standards; units g/mole. H.p.l.c. grade THF containing 0.5% w/v LiBr was used as eluent.
c): Measured on DSC under nitrogen atmosphere (50 mL/min) with a heating rate of 20° C./min.
d): Temperature for 5% weight loss under nitrogen atmosphere (200 mL/min) with a heating rate of 20° C./min.

Examples 6 and 7

The procedure of example 1 was repeated with replacement of hydroquinone with a mixture of hydroquinone and 4,4-biphenol (molar ratio of 1:4), and a mixture of 9,9'-bis(4-hydroxyphenyl) fluorene and 4,4'-bipheniol (molar ratio of 1:9) (Table II), respectively.

TABLE II

| Example | Ar | | | | |
|---------|-----|----|------|------|-----|-----|
| 6 | –⟨C₆H₄⟩– | 95 | 1782 | 8580 | 193 | 369 | m1:m2 = 1:4

TABLE II-continued

| Example | Ar | | | | |
|---|---|---|---|---|---|
| 7 | (9,9-diaryl fluorene structure) m1:m2 = 1:9 | 96 | 1414 | 3228 | 210 | 397 | a): Isolated yield.
b): measured by GPC and calibrated against polystyrene standards; units g/mole. H.p.l.c. grade THF containing 0.5% w/v LiBr was used as eluent.
c): Measured on DSC under nitrogen atmosphere (50 mL/min) with a heating rate of 20° C./min.
d): Temperature for 5% weight loss under nitrogen atmosphere (200 mL/min) with a heating rate of 20° C./min.

Example 8

The procedure of example 1 was repeated with replacement of 4,4'-difluorophenyl sulfoxide with a mixture of 4,4'-difluorophenyl sulfoxide and 4,4'-difluorobenzophenone (molar ratio of 1:1) (Table III), and replacement of hydroquinone with 4,4'-thiodiphenol.

TABLE III

| Example | Yield (%)$^a$ | Mn$^b$ | Mw$^b$ | Tg(°C.)$^c$ | Tm(°C.)$^c$ | T$_{-5\%}$$^d$ |
|---|---|---|---|---|---|---|
| 8 | 94 | 1586 | 5253 | 131 | 316 | 490 |

$^a$Isolated yield.
$^b$measured by GPC and calibrated against polystyrene standards; units g/mole. H.p.l.c. grade THF containing 0.5% w/v LiBr was used as eluent.
$^c$Measured on DSC under nitrogen atmosphere (50 mL/min) with a heating rate of 20° C./min.
$^d$Temperature for 5% weight loss under nitrogen atmosphere (200 mL/min) with a heating rate of 20° C./min.

Preparation of cyclic (aryl thioether ketone)s oligomers

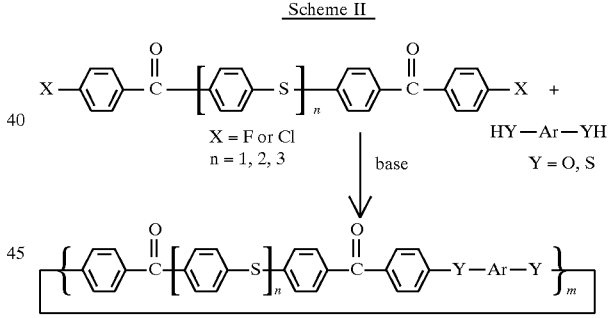

Scheme II

Scheme II schematically shows the general starting materials and the cyclic poly(aryl thioether ketone) oligomer products. In the particular examples shown below, 4,4'-bis(4-fluorobenzoyl)diphenylsulfide (n=1, X=F) was used as the dihalide monomer. Since the solubility of 4,4'-bis(4-fluorobenzoyl)diphenylsulfide in DMF was limited, the pseudo-high dilution conditions can not be used, instead, high-dilution conditions have been applied and high yields of cyclic oligomers were formed without the need of employing bisphenols with special geometry that promote cyclic formation. In this way, the yield of cyclic dimers is extremely high. A typical cyclic mixture contain 71.3% dimer, 15.7% trimer, 6.6% tetramer, 3.0% pentamiier and 3.4% higher homologues. The following examples are illustrative and not intended to limit its scope.

Example 9

To a 1 L three-necked, round-bottom flask equipped with a thermometer, magnetic stirring, nitrogen inlet and Dean- Stark trap with attached water-cooled condenser, DMF (750 mL), toluene (100 mL), anhydrous potassium carbonate (1.658 g, 12.0 mmol) were charged. Then, 4,4'-bis(4-fluorobenzoyl)diphenyl sulfide (2.5828 g, 6.0 mmol) and hydroquinone (0.6607 g, 6.0 mmol) were added. The reaction mixture was magntetically stirred and heated to reflux under nitrogen atmosphere. The mixture was kept refluxing for 15 h at 145–8° C. At the end of reaction, the reaction mixture was cooled and filtered to remove salts. The filtrate was then concentrated to 100 mL under reduced pressure. The concentrated solution was added dropwise to vigorously stirred distilled water (700 mL) containing 10 mL of concentrated hydrochloric acid. the desired oligomers precipitated as a white solid. The solid was collected by filtration and washed several times with distilled water. Then, the cyclic oligomers were transferred to a beakeir containing 200 mL methanol. After stirring for 10 min, the cyclic oligomers were filtered and dried in a vacuum oven (140° C.) for 24 h to give 2.7 g (90% yield) of cyclic oligomers 9.

Examples 10 and 11

The above procedure was repeated with replacing hydroquinone with 4,4'-biphenol, and 4,4'-thiodiphenol respectively (Table IV).

Example 12

The procedure of example 1 was repeated with replacement of hydroquinone with 4,4'-thiodiphenol, and replacement of 4,4'-difrluorophenyl sulfoxide with 1,2-bis(4-fluorobenzoyl)-3,6-diphenylbenzene (Table V).

Example 13

The procedure of example 1 was repeated with replacement of hydroquinone with 4,4'-thiodiphenol, and replacement of 4,4'-difluorophenyl sulfoxide with 4,4'-difluorobenzophenone. The crude cyclic oligomers contained 10% high molecular weight polymer. The cyclic was then purified by soxhlet extraction using ethyl acetate as solvent to give 80% yield of polymer-free cyclic oligomers 13 (Table V).

TABLE IV

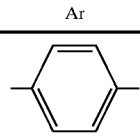

| Example | Ar | | | | | $T_{-5\%}^{e}$ |
|---|---|---|---|---|---|---|
| 9 | 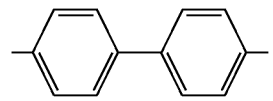 | 90 | 1361 | 1683 | 143 | 301 | 501 |
| 10 | 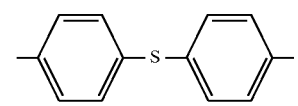 | 95 | —$^c$ | —$^c$ | —ND | 334,377 | 504 |
| 11 | | 97 | 930 | 1171 | 139 | 399 | 467 |

$^a$Isolated yield.
$^b$measured by GPC and calibrated against polystyrene standards; units g/mole. H.p.l.c. grade chloroform was used as eluent.
$^c$not soluble in chloroform.
$^d$Measured on DSC under nitrogen atmosphere (50 mL/min) with a heating rate of 20° C./min. ND: not detected.
$^e$Temperature for 5% weight loss under nitrogen atmosphere (200 mL/min) with a heating rate of 20° C./min.

TABLE V

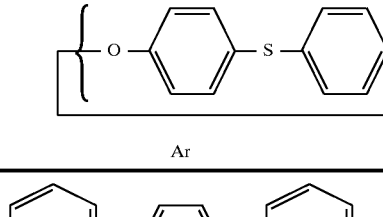

| Example | Ar | | | | | |
|---|---|---|---|---|---|---|
| 12 | 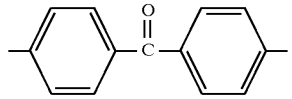 | 90 | 1572 | 5358 | 193 | 385 | 462 |
| 13 | 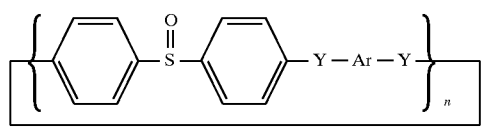 | 80 | 443 | 663 | 121 | 381 | 479 | a): Isolated yield.
b): measured by GPC and calibrated against polystyrene standards; units g/mole. H.p.l.c. grade chloroform was used as eluent.
c): Measured on DSC under nitrogen atmosphere (50 mL/min) with a heating rate of 20° C./min.
d): Temperature for 5% weight loss under nitrogen atmosphere (200 mL/min) with a heating rate of 20° C./min.

Preparation of Cyclic (Aryl Ether Sulfide)s Oligomers

Cyclic (atyl ether sulfoxide) oligomers can be easily reduced to the corresponding sulfide oligomers thus providing a new class of cyclics.

Scheme III shows one method to convert sulfoxide oligomers to the corresponding sulfide oligomers. 1,1,2,2-Tetiachloroethane was used as reaction medium, other chlorinated solvents can also be used. A suitable range of temperatures for the reaction is from room temperature to 80° C., with 40°–60° C. being preferred. The following examples are illustrative and not intended to limit its scope. The complete reduction of sulfoxide oligomers to the corresponding sulfide oligomers, and their cyclic nature have been unambiguously confirmed by a combination of matrix assisted laser desorption mass spectrometry (MALDI-TOF-MS), $^1$H and $^{13}$C NMR, reverse phase high pressure liquid chromatography (HPLC), and gel permeation chromatography (GPC) techniques.

Scheme III

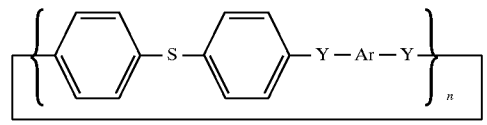

Example 14

To a 250 mL three-necked round-bottom flask, equipped with magnetic stirring, nitrogen inlet and condenser, cyclic oligomers 1 (3.0 g, 9.73 mmol), tetrabutylammonium iodide (9.153 g, 24.31 mmol) and 1,1,2,2-tetrachloroethane (125 mL) were charged. The mixture was magnetically stirred and heated to 50° C. under a slow stream of nitrogen. Once the cyclic oligomers were dissolved, oxalyl chloride (1.04 mL, 11.68 mmol) was added rapidly via syringe to the rapidly stirring solution. Immediately upon introduction of the oxalyl chloride, iodine was liberated, gas (presumably carbon monoxide and carbon dioxide) was evolved, and the corresponding sulfide cyclic oligomers precipitated in the form of fine particles. The reaction mixture was stirred at 50° C. for 10 min, then poured into vigorously stirred methanol (500 mL) and filtered. The cyclic oligomer particles were washed several times with methanol, and transferred into a beaker containing a 5% w/v aqueous solution of sodium thiosulfate (300 mL). After stirring for 20 min, the cyclic oligomer was again collected by filtration and washed several times with distilled water (1 L) followed by methanol (200 mL). the cyclic oligomers were filtered and dried in a vacuum oven (140° C.) for 24 h to give a quantitative yield of cyclic oligomers 14.

Examples 15–18

The above procedure for cyclic oligomers 14 was repeated replacing cyclic oligomers 1 with cyclic oligomers 2, 3, 4 and 5 respectively (Table VI).

TABLE VI $$\left[ O-\phantom{}\!\!\bigcirc\!\!-S-\!\!\bigcirc\!\!-O-Ar \right]_n$$

| Example | Ar | | | | | |
|---|---|---|---|---|---|---|
| 14 | –⟨phenyl⟩– | —b | —b | —ND | 237 | 457 |
| 15 | –⟨biphenyl⟩– | —b | —b | —ND | 351 | 550 |
| 16 | –⟨C6H4–S–C6H4⟩– | —b | —b | 82 | 267 | 518 |
| 17 | –⟨C6H4–C(CF3)2–C6H4⟩– | 3123 | 11158 | 137 | —ND | 526 |
| 18 | –⟨fluorenylidene-bis-phenyl⟩– | 1924 | 10578 | 221 | 411 | 546 | a: measured by GPC and calibrated against polystyrene standards; units g/mole. H.p.l.c. grade THF containing 0.5% w/v LiBr was used as eluent.
b: not soluble in THF.
c: Measured on DSC under nitrogen atmosphere (50 mL/min) with a heating rate of 20° C./min
ND: not detected.
d: Temperature for 5% weight loss under nitrogen atmosphere (200 mL/min) with a heating rate of 20° C./min.

Examples 19 and 20

The above procedure for cyclic oligomcis 14 was repeated replacing cyclic oligomers 1 with cyclic oligomers 6 and 7 respectively (Table VII).

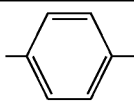

| Example | Ar | Tg(°C.)[a] | Tm(°C)[a] | T$_{-5\%}$[b] |
|---|---|---|---|---|
| 19 | (structure) m1:m2 = 1:4 | —ND | 297 | 516 |
| 20 | (structure) m1:m2 = 1:9 | —ND | 310 | 542 |

[a]Measured on DSC under nitrogen atmosphere (50 mL/min) with a heating rate of 20° C./min.
ND: not detected.
[b]Temperature for 5% weight loss under nitrogen atmosphere (200 mL/min) with a heating rate of 20° C./min.

Example 21

The above procedure for cyclic oligomers 14 was repeated replacing cyclic oligomers 1 with cyclic oligomers 8 (Table VIII).

TABLE VIII

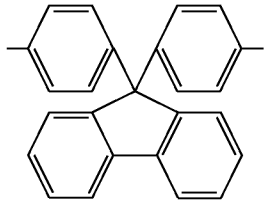

| Example | Mn[a] | Mw[a] | Tg(°C.)[b] | Tm(°C)[b] | T$_{-5\%}$[c] |
|---|---|---|---|---|---|
| 21 | 1817 | 7828 | 105 | 233,287 | 515 |

[a]measured by GPC and calibrated against polystyrene standards; units g/mole. H.p.l.c. grade THF containing 0.5% w/v LiBr was used as eluent.
[b]Measured on DSC under nitrogen atmosphere (50 mL/min) with a heating rate of 20° C./min.
[c]Temperature for 5% weight loss under nitrogen atmosphere (200 mL/min) with a heating rate of 20° C./min.

Polymerization of Cyclic Poly(aryl thioether ketone) Oligomers

Although aryl thioether and aryl thioether polymers are well known for thermal stability and chemical resistance, the applicants have discovered a catalyst system that causes the cyclic thioethers to ring open, ultimately producing high molecular weight polymers. The catalysts which can be used for the free-radical ring-opening polymerization include various compounds which generate sulfur radicals upon treatment at elevated temperatures. This process is schematically shown in scheme IV.

Scheme IV

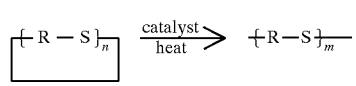

This process is applicable to a wide variety of thioether containing cyclic oligomers. The preferred catalysts are elemental sulfur and organic disulfides such as 2,2'-dithiobis (benzothiaole) (DTB) or diphenyldisulfide. The polymerization is typically effected by simply contacting the cyclic oligomers with the catalyst at temperatures up to 400° C., preferably about 300°–360° C., until polymerization has proceeded to the extent desired. Although the use of a solvent is within the scope of the invention, it is generally not preferred. In general, the amount of catalyst used is about 0.5–5.0 (mole) % based on structural units in the cyclic oligomers. The following examples are illustrative and not intended to limit its scope.

Examples 22–25

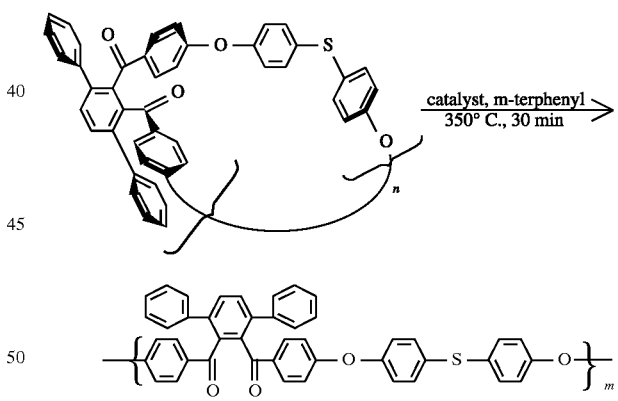

Cyclic poly(aryl ether thioether ketone) oligomers from example 12 (2.0 g), having a number average molecular weight of about 1600, and a catalytic amount of 2,2'-dithiobis(benzothiazole) (DTB) or elemental sulfur were mechanically mixed with m-terphenyl (2.0 g) in a 50 mL test-tube, equipped with a nitrogen inlet and outlet. The mixture was then heated under nitrogen at 350 ° C. for 30 min, after which the reaction mixture was cooled and dissolved in chloroform and the resulting solution was added dropwise into a vigorously agitated large excess of methanol. A fibrous polymer was precipitated and filtered. The resulting polymer was analyzed by GPC, and the relevant parameters and results are shown in Table IX.

TABLE IX

| Example | Catalyst | Conversion of cyclic to polymer (%) | Mn[b] | Mw[b] |
|---|---|---|---|---|
| 22 | none | 48 | 40,750 | 185,550 |
| 23 | 2.0 (mole) % S | 80 | 53,760 | 266,590 |
| 24 | 2.0 (mole) % DTB[a] | 84 | 34,950 | 228,310 |
| 25 | 2.0(mole) % S + 2.0 (mole) % DTB[a] | 92 | 36,300 | 203,500 |

[a]: 2,2'-dithiobis(benzothiazole).
[b]: measured by GPC and calibrated against polystyrene standards; units g/mole. H.p.l.c. grade chloroform was used as eluent.

Example 26–30

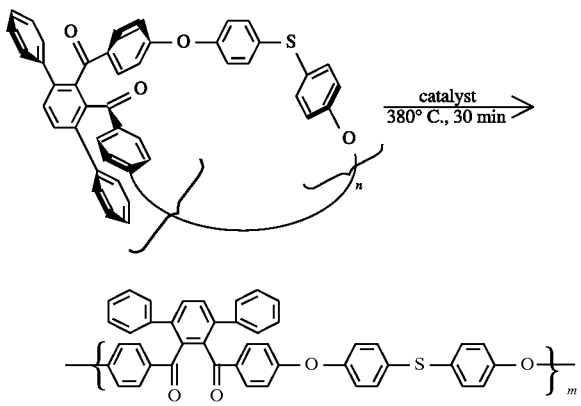

Cyclic poly(aryl ether thioether ketone) oligomers from example 12 (2.0 g), having a number average molecular weight of about 1600, and catalytic amount of 2,2'-dithiobis (benzothiazole) (DTB) were mechanically mixed in a 50 mL test-tube dipped with a nitrogen inlet and outlet. The mixture was then heated under nitrogen at 380° C. for 30 min. The resulting polymer was removed by breaking the test tube. A portion of the material was dissolved in chloroform and analyzed by GPC. The relevant parameters and results are shown in Table X.

TABLE X

| Example | Catalyst | Conversion of cyclic to polymer (%) | Mn[b] | Mw[b] |
|---|---|---|---|---|
| 26 | none | 67.5 | 18,27 | 58,98 |
| 27 | 0.5 (mole) % DTB[a] | 84 | 33,68 | 83,57 |
| 28 | 1.0 (mole) % DTB[a] | 86 | 31,84 | 76,38 |
| 29 | 2.0 (mole) % DTB[a] | 91 | 28,24 | 64,49 |
| 30 | 5.0 (mole) % DTB[a] | 100 | 8,040 | 35,41 |

[a]: 2,2'-
[b]: measured by GPC and calibrated against polystyrene standards; units H.p.l.c. grade chloroform was used as Example 31

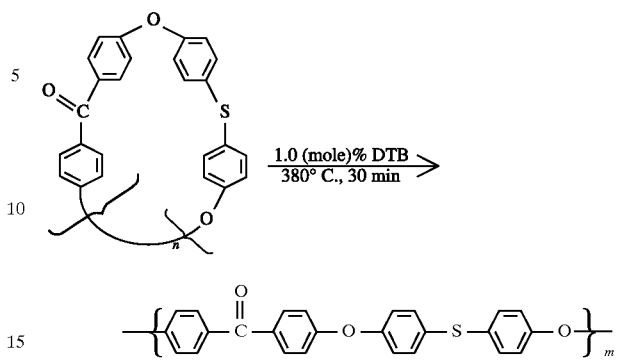

Cyclic poly(aryl ether thioether ketone) oligomers from example 13 (2.0 g), having a number average molecular weight of about 443, and a catalytic amount of 2,2'-dithiobis (benzothiazole) (DTB) (16.8 mg) were mechanically mixed in a 50-mL test-tube, equipped with a nitrogen inlet and outlet. The mixture was then heated under nitrogen at 380° C. for 30 min. The resulting polymer had a glass transition temperature of 138° C. (a 17° C. increase compared to the starting oligomers of example 13), and was very tough and insolulbe in most organic solvents.

Polymerization of Cyclic Poly(aryl ether sulfide) Oligomers

Example 32

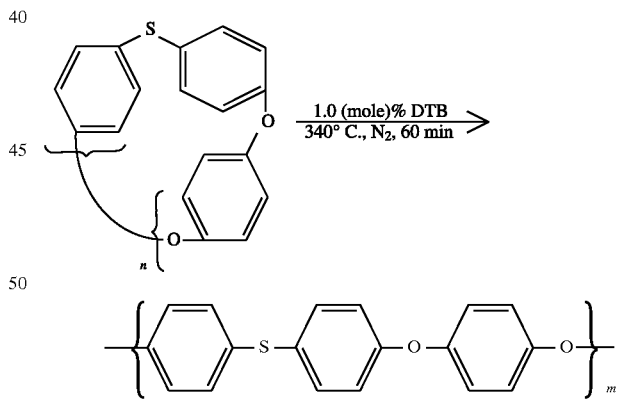

Cyclic poly(aryl ether sulfide) oligomers 14 (0.5 g) and a catalytic amount of 2,2'-dithiobis(benzothiazole) (DTB) (5.8 mg) were mechanically mixed in a 50-mL testing-tube, equipped with a nitrogen inlet and outlet. The mixture was then heated under nitrogen at 340° C. for 60 min. The resulting polymer was tough and insolube in most organic solvent. DSC analysis revealed that the material was highly crystalline and had a Tg of 98° C., a Tm of 240° C. and a melting enthalpy of 28.0 J/g.

Examples 33–35

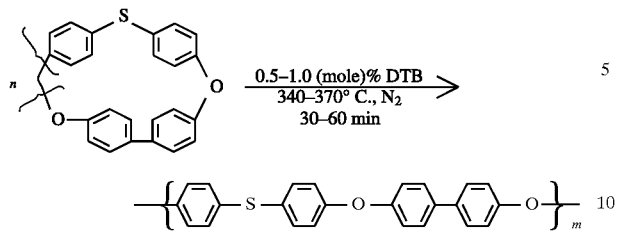

Cyclic poly(aryl ether sulfide) oligomers from example 15 (0.5 g) and a catalytic amount of 2, 2'-dithiobis (benzothiazole) (DTB; 0.5 to 1.0 (mole)% catalyst) were mechanically mixed in a 50 mL test-tube, equipped with a nitrogen inlet and outlet. The mixture was then heated under nitrogen at temperatures ranging from 340° to 370° C. for 30 to 60 min. The resulting polymer was very tough and insolube in most organic solvent, but Soluble in boiling 1-chloronaphthalene. DSC analysis revealed that the material was highly crystalline and readily recrystlized upon heating after quenching without any annealing. The results are shown in Table XI.

Example 37

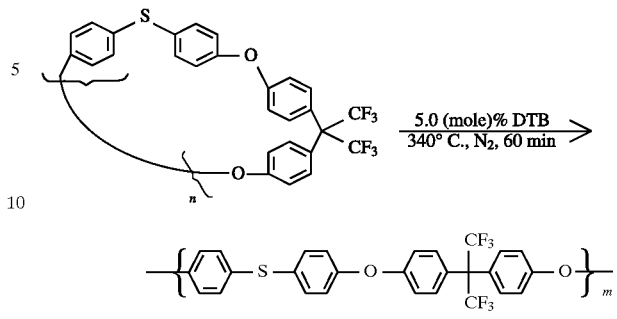

Cyclic poly(aryl ether sulfide) oligomers from example 17 (0.5 g) and a catalytic amount of 2,2'-dithiobis (benzothiazole) (DTB) (16.3 mg) were mechanically mixed in a 50 mL test-tube, equipped with a nitrogen inlet and outlet. The mixture was then heated under nitrogen at 340° C. for 60 rain. A portion of the resulting polymer was dissolved into chloroform and analysed by GPC to give a Mn of 16,670 and a Mw of 44,130.

TABLE XI

| Example | Catalyst | Reaction conditions | Tg(°C.)[b] | Tm(°C.)[b] | ΔHm(J/g)[c] |
|---|---|---|---|---|---|
| 33 | 1.0 (mole) % DTB[a] | 340° C., N$_2$, 60 min | 150 | 332 | 37 |
| 34 | 0.5 (mole) % DTB[a] | 370° C., N$_2$, 30 min | 149 | 327 | 32 |
| 35 | 1.0 (mole) % DTB[a] | 370° C., N$_2$, 30 min | 150 | 329 | 30 |

[a]: 2,2'-dithiobis(benzothiazole).
[b]: measured on DSC under nitrogen atmosphere (150 mL/min) with a heating rate of 20° C./min.
[c]: measured on DSC under nitrogen atmosphere (150 mL/min) with a heating rate of 20° C./min. and calibrated against Indium.

Example 36

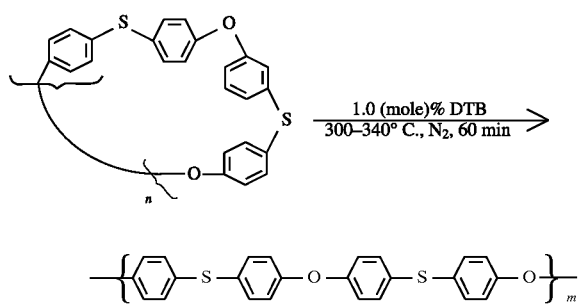

Cyclic poly(aryl ether sulfide) oligomers from example 16 (0.5 g) and a catalytic amount of 2,2'-dithiobis (benzothiazole) (DTB) (4.2 mg) were mechanically mixed in a 50 mL test-tube, equipped with a nitrogen inlet and outlet. The mixture was then heated under nitrogen at 300° or 340° C. for 60 min. The resulting polymer had a glass transition temperature of 94° C. ( a 12° C. increase compared to the starting oligomers of example 16), and was tough and insolulbe in most organic solvent.

Example 38

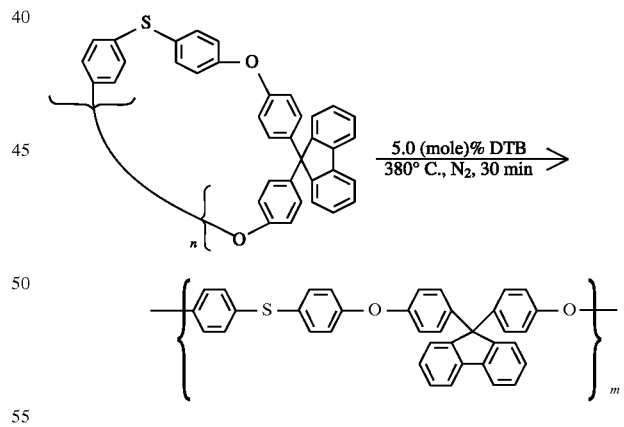

Cyclic poly(aryl ether sulfide) oligomers from example 18 (0.5 g) and a catalytic amount of 2,2'-dithiobis (benzothiazole) (DTB) (15.7 mg) were mechanically mixed in a 50 mL test-tube, equipped with a nitrogen inlet and outlet. The mixture was then heated under nitrogen at 380° C. for 30 min. The resulting material was tough and only partially soluble in chloroform. The soluble fraction was analyzed by GPC to give a Mn of 16,720 and a Mw of 52,980, and there was only a very small fraction of cyclic dimer remaining.

Example 39

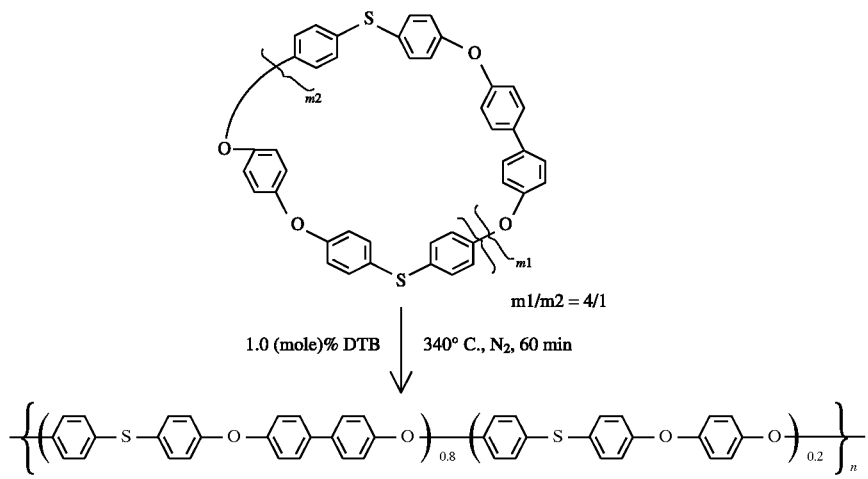

Cyclic poly(aryl ether sulfide) oligomers from example 19 (0.5 g) and a catalytic amount of 2,2'-dithiobis(benzothiazole) (DTB) (4.8 mg) were mechanically mixed in a 50 mL test-tube, equipped with a nitrogen inlet and outlet. The mixture was then heated under nitrogen at 340° C. for 60 min. The resulting polymer was very tough and insoluble in most organic solvents. DSC analysis revealed that the material was highly crystalline and had a Tg of 140° C., a Tm of 286° C. and a melting enthalpy of 18.2 J/g.

Cyclic poly(aryl ether sulfide) oligomers from example 20 (0.5 g) and a catalytic amount of 2,2'-dithiobis(benzothiazole) (DTB) (5.8 mg) were mechanically mixed in a 50 mL test-tube, equipped with a nitrogen inlet and outlet. The mixture was then heated under nitrogen at 340° C. for 60 min. The resulting polymer was very tough and insoluble in most organic solvents. DSC analysis revealed that the material was highly crystalline and had a Tg of 163° C., a Tm of 310° C. and a melting enthalpy of 24.6 J/g.

Example 40

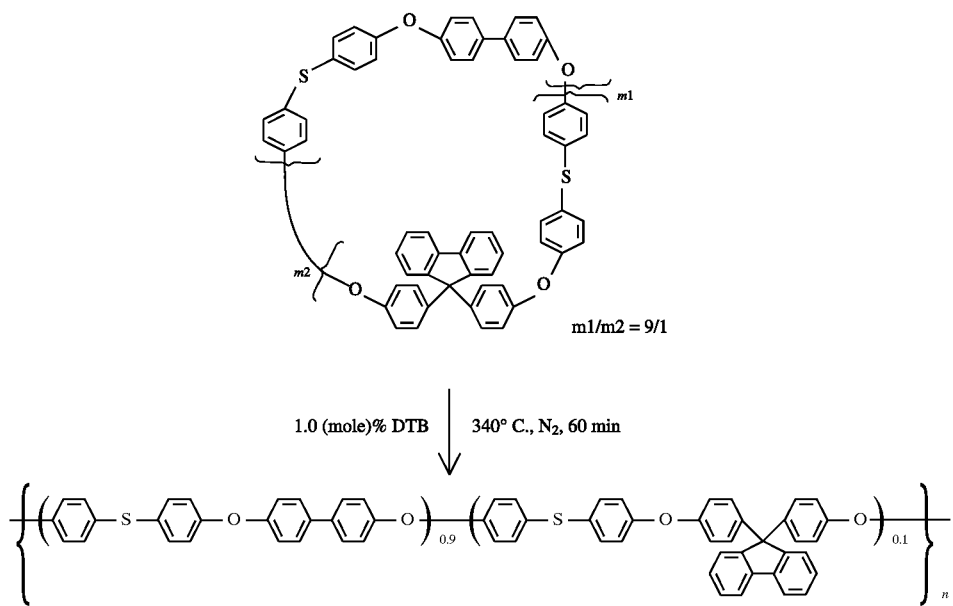

Example 41

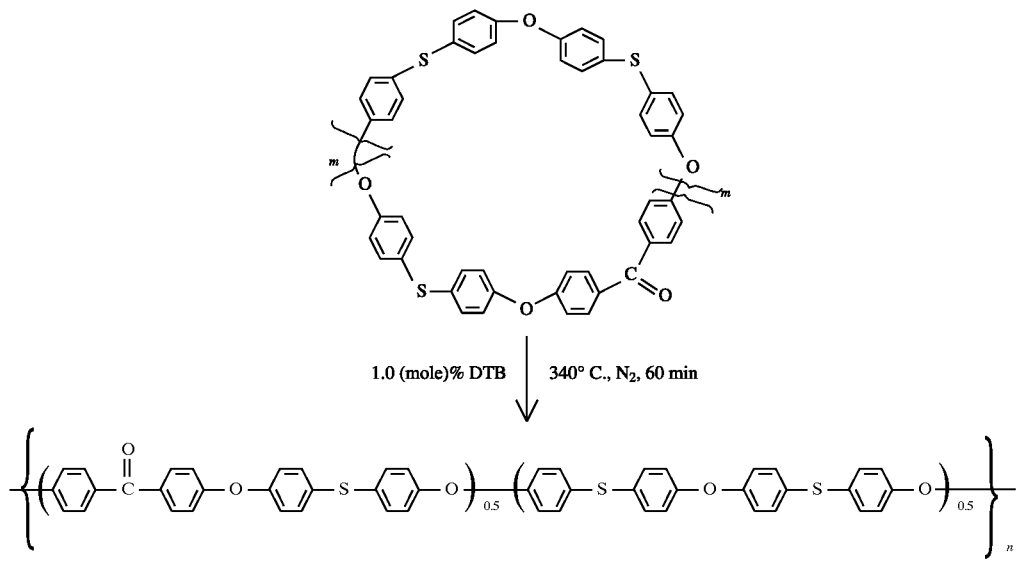

Cyclic poly(aryl ether sulfide) oligomers from example 21 (0.5 g) and a catalytic amount of 2,2'-dithiobis (benzothiazole) (DTB) (4.2 mg) were mechanically mixed in a 50 nL test-tube, equipped with a nitrogen inlet and outlet. The mixture was then heated under nitrogen at 340° C. for 60 min. The resulting polymer had a glass transition temperature of 113° C. (an 8° C. increase compared to the starting oligomers of example 21). The material was tough and insoluble in most organic solvents.

Polymerization of Cyclic Poly(1,4-phenylene sulfide) Oligomers

Macrocyclic 1,4-phenylene sulfides such as the hexamer are known. (Frank, J. and Vogtle, F. Tetrahedron Lett., 25, 3445 (1984). The cyclic poly(1,4-phenyllene sulfide) oligomer mixtures used for the following polymerization example were prepared using a method similar to that reported.

Preparation of cyclic poly(1,4-phenylene sulfide) oligomers

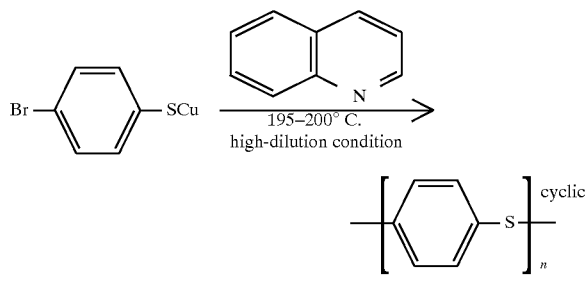

To a 1 L thee-necked, round-bottom flask equipped with a thermometer, magnetic stirring, an argon inlet and a water-cooled condenser, fresh-distilled quinoline (400 mL) and copper (I) p-bromo-thiophenoxide (0.60 g) were charged. The mixture was heated and the copper salt dissolved. The solution was then kept at 195°–200° C. for 8 h after which 0.60 g of the copper salt was added and the reaction solution was kept at temperature for another 8 h. This process was repeated evey 8 h until, overall, 3.60 g (14.31 mmol) of the copper salt was added to give a final concentration of product of 35.8 mM. At the end of reaction, the solution was concentrated to 50 mL under reduced presure. Then, the concentrated solution was added dropwise into 800 mL of 50% (aqueous) methanol containing 20 mL of concentrated hydrochloric acid, and the product precipitated as a gray solid. After filtration, the gray solid was stirred with 100 mL of concentrated hydrochloric acid for 10 min, and then washed with distilled water until HCl free. The dried solid was redissolved in chloroform, filtered through a thin-layer of Celite and reprecipitated into methanol. The precipitate was filtered and dried. The crude product Was then extracted with warm ethyl acetate to remove any linear oligomers to give a 50% yield of cyclic poly(l, 4-phenylene sulfide) oligomeis.

The cyclic nature of the product was confirmed by a combination of $^1$H NMR, GPC and HPLC. GPC and HPLC analyses revealed that the cyclic mixtures contain 20% tetramer, 40% pentamer, 20% hexamer and 20% higher homologues. DSC analysis showed that the cyclic oligomers had a Tg of 63° C., a Tm of 217° C. and a melting enthalpy of 35.0 J/g followed by an extherom peak centered at 379° C.

Example 42

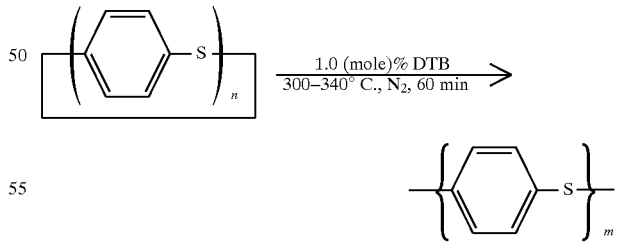

The above cyclic poly(1,4-phenylene sulfide) oligomers (0.10 g) and a catalytic amount of 2,2'-dithiobis (benzothiazole) (DTB) (3.1 mg) were mechanically mixed in a 50 mL test-tube, equipped with a nitrogen inlet and outlet. The mixture was then heated under nitrogen at 300° or 340° C. for 60 min. The resulting polymer was insoluble in most organic solvents. DSC analysis revealed that the material was highly crystalline and had a Tg of 85° C., a Tm of 279° C. and a melting enthalpy of 46.8 J/g.

We Claim:

1. A process for producing a polyarylene sulfide consisting of a free-radical, ring-opening polymerization of a cyclic aromatic thioether.

2. A process according to claim 1, wherein said cyclic aromatic thioether is an oligomer.

3. A process according to claim 1, wherein said polymerization is at a temperature of 250° to 400° C. in the presence of a polymerization initiator effective to generate sulfur containing free radicals.

4. A process according to claim 3, wherein said initiator is elemental sulfur.

5. A process according to claim 3 wherein said initiator is an organic disulfide.

6. A process according to claim 3, wherein said initiator comprises a mixture of sulfur and an organic disulfide.

7. A process according to claim 1, for producing a polyarylene sulfide containing units of formula (I)

$$\mathrm{-\!\!\!+\!Ar\!-\!S\!+\!\!\!-} \quad (I)$$

in which Ar is an arylene radical, consisting of heating a cyclic arylthioether oligomer containing at least one of said units at an elevated temperature, in the presence of a polymerization initiator, generating sulfur-containing free radicals at said elevated temperature from said polymerization initiator, with ring-opening of said oligomer, to form ring-opened oligomer units in the presence of said sulfur-containing free radicals to form said polyarylene sulfide consisting of said oligomer units and said initiator.

8. A process according to claim 7, wherein said initiator is elemental sulfur.

9. A process according to claim 7, wherein said initiator is an organic disulfide.

10. A process according to claim 7, wherein said initiator comprises a mixture of sulfur and an organic disulfide.

11. A process according to claim 8, wherein said elevated temperature is 300°–360° C.

12. A process according to claim 9, wherein said elevated temperature is 300°–360° C.

13. A process according to claim 11, wherein said oligomer contains a plurality of said units of formula (I).

14. A process according to claim 12, wherein said oligomer contains a plurality of said units of formula (I).

15. A process according to claim 13, wherein said oligomer contains other units in addition to those of formula (I), said other units being linked to the units (I).

16. A process according to claim 15, wherein said other units are selected from units of formula (II) and units of formula (III)

$$\mathrm{-Y\!-\!Ar_1\!-\!Y\!-} \quad (II)$$

$$\mathrm{-Ar_2\!-\!\overset{\overset{\displaystyle O}{\|}}{C}\!-} \quad (III)$$

in which $Y_1$ and $Y_2$ are the same or different and are —S— or —O—, and $Ar_1$ is a divalent arylene radical, selected from:

phenylene

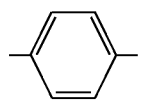

-continued biphenylene

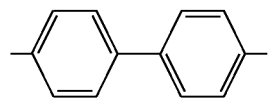

4,4'-thiodiphenyl

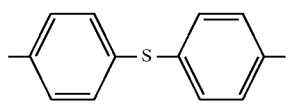

4,4'-oxydiphenyl

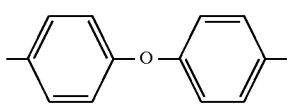

2,2'-bis(4-phenyl)hexafluoropropane

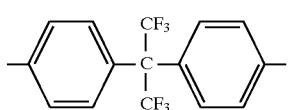

diphenyl fluorene radicals

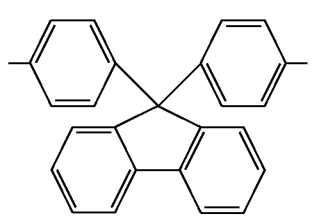

carbonyl-diphenyl

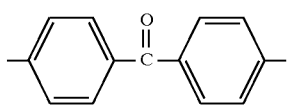

diphenyl-dibenzoylbenzene radical

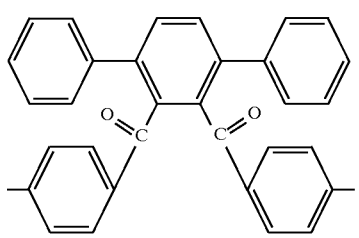

and $Ar_2$ is as defined for $Ar_1$.

17. A process according to claim 14, wherein said oligomer contains other units in addition to those of formula (I), said other units being linked to the units (I).

18. A process according to claim 17, wherein said other units are selected from units of formula (II) and units of formula (III):

$$\mathrm{-Y\!-\!Ar_1\!-\!Y\!-} \quad (II)$$

$$\mathrm{-Ar_2\!-\!\overset{\overset{\displaystyle O}{\|}}{C}\!-} \quad (III)$$

in which $Y_1$ and $Y_2$ are the same or different and are —S— or —O—, and Ar is a divalent arylene radical selected from phenylene

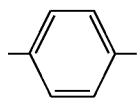

biphenylene

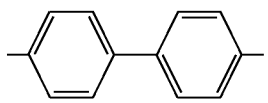

4,4'-thiodiphenyl

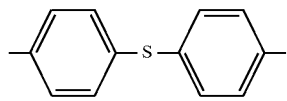

4,4'-oxydiphenyl

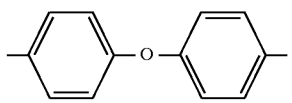

2,2'-bis(4-phenyl)hexafluoropropane

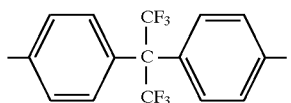

diphenyl fluorene radicals

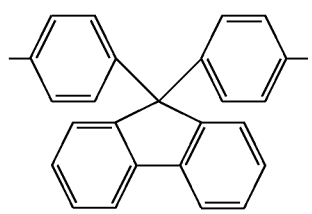

carbonyl-diphenyl

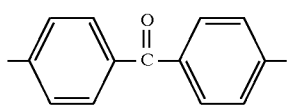

diphenyl-dibenzoylbenzene radical

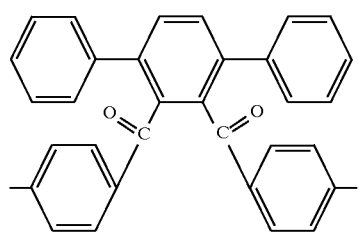

and $Ar_2$ is as defined for $Ar_1$.

19. A polyarylene sulfide derived from a non-ionic, free radical ring opening polymerization of a cyclic arylether oligomer, being free of residues of inorganic ring-opening polymerization catalysts and free of inorganic contaminants, as formed from said ring-opening polymerization.

20. A polyarylene sulfide according to claim 19, containing units of formula (I):

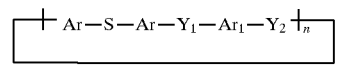 (I)

in which Ar is an arylene radical.

21. A polyarylene sulfide according to claim 20, wherein said arylene radical has 6 to 24 carbon atoms and is unsubstituted or substituted by $C_1$–$C_{12}$ alkyl or $C_1$–$C_{12}$ alkoxy.

22. A polyarylene sulfide according to claim 19, wherein said oligomer is of formula (IV)

$$\left[ Ar-S-Ar-Y_1-Ar_1-Y_2 \right]_n \quad (IV)$$

wherein:

Ar is an arylene radical of 6 to 24 carbon atoms, unsubstituted or substituted by $C_1$–$C_{12}$ carbon atoms, unsubstituted or substituted by $C_1$–$C_{12}$ alkyl or $C_1$–$C_{12}$ alkoxy, $Ar_1$ is a divalent arylene radical selected from phenylene

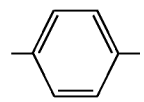

biphenylene

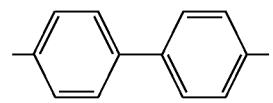

4,4'-thiodiphenyl

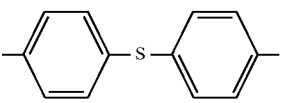

4,4'-oxydiphenyl

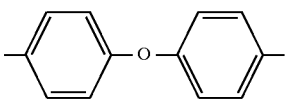

2,2'-bis(4-phenyl)hexafluoropropane

diphenyl fluorene radicals

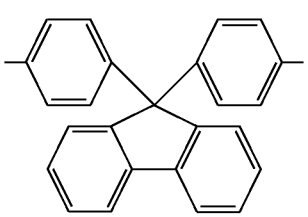

carbonyl-diphenyl

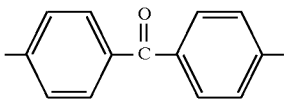

diphenyl-dibenzoylbenzene radical

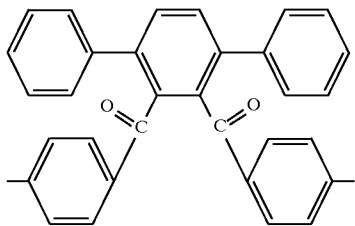

provided that Ar and Ar$_1$ are different arylene radicals,

Y$_1$ and Y$_2$ are the same or different and are —S— or —O—, and n is an integer of 2 to 8.

23. A polyarylene sulfide according to claim 22, wherein at least one of Y$_1$ and Y$_2$ is —O—.

24. A polyarylene sulfide according to claim 19, wherein said oligomer is of formula (V):

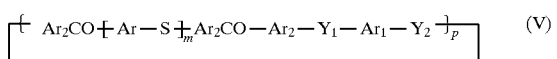

wherein:

Ar is an arylene radical of 6 to 24 carbon atoms, unsubstituted or substituted by C$_1$–C$_{12}$ alkyl or C$_1$–C$_{12}$ alkoxy, Ar$_1$ and Ar$_2$ are each divalent arylene radicals the same or different, selected from phenylene

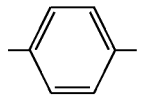

biphenylene

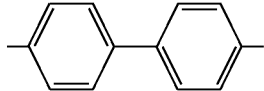

4,4'-thiodiphenyl

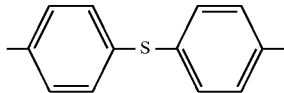

4,4'-oxydiphenyl

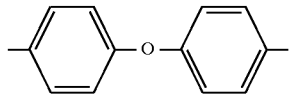

Assistant Commissioner for Patents 2,2'-bis(4-phenyl)hexafluoropropane

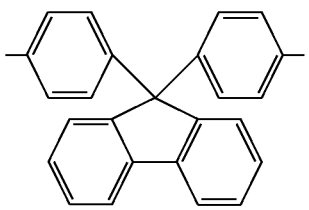

diphenyl fluorene radicals

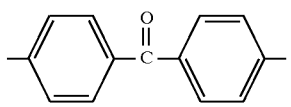

carbonyl-diphenyl

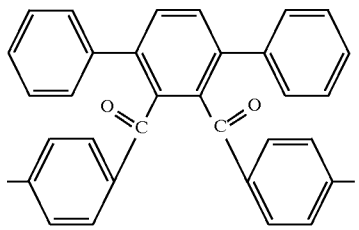

diphenyl-dibenzoylbenzene radical

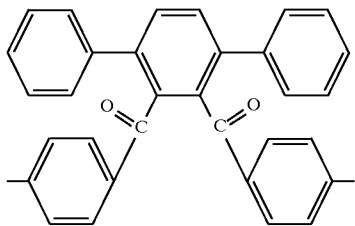

provided that Ar and at least one of Ar$_1$ and Ar$_2$ are different arylene radicals, Y$_1$ and Y$_2$ are the same or different and are —S— or —O—, m is an integer of 2 to 6 and p is an integer of 1 to 8.

25. A polyarylene sulfide according to claim 24, wherein at least one of Y$_1$ and Y$_2$ is —O—.

26. A polyarylene sulfide according to claim 20, consisting of said units of formula (I) and residues of a polymerization initiator which generates sulfur-containing free radicals at an elevated temperature.

* * * * *